United States Patent [19]

Schweiker

[11] Patent Number: 4,693,664
[45] Date of Patent: Sep. 15, 1987

[54] PROGRAM-CONTROLLED INDUSTRY ROBOT IN PARTICULAR LAQUERING (OR PAINTING) ROBOT

[75] Inventor: Werner Schweiker, Gemmrigheim, Fed. Rep. of Germany

[73] Assignee: Hermann Behr & Sohn GmbH & Co., Ingersheim, Fed. Rep. of Germany

[21] Appl. No.: 638,032

[22] Filed: Aug. 6, 1984

[30] Foreign Application Priority Data

Aug. 6, 1983 [DE] Fed. Rep. of Germany ....... 8322699

[51] Int. Cl.⁴ .......................... B25J 17/02; B25J 18/04
[52] U.S. Cl. .................................... 414/735; 414/912; 901/29; 901/43
[58] Field of Search .......................... 901/7, 15, 29, 43; 414/4, 735, 718, 912, 728; 294/2

[56] References Cited

U.S. PATENT DOCUMENTS

| | | | |
|---|---|---|---|
| 4,342,535 | 8/1982 | Bartlett et al. | 901/43 |
| 4,428,710 | 1/1984 | Grisebach et al. | 414/735 X |
| 4,430,037 | 2/1984 | Bisiach | 901/29 |
| 4,498,414 | 2/1985 | Kiba et al. | 901/43 |

FOREIGN PATENT DOCUMENTS 2927485 1/1981 Fed. Rep. of Germany ........ 901/28

Primary Examiner—Robert J. Spar
Assistant Examiner—Donald W. Underwood
Attorney, Agent, or Firm—Reising, Ethington, Barnard, Perry & Milton

[57] ABSTRACT

A programmed controlled industry robot for the treatment of work pieces having movable parts (24) to be moved prior to treatment comprises a support arm (15) swivelable three dimensionally and a swivel head (17) affixed at the free end of the support arm (15). The swivel head (17) carries a tool and has a plurality of axes and being rotatable around the axes. The axes of the swivel head (17) are loaded with considerably smaller forces than the swivel axes of the support arm (15). A support member (25) moveable with the support arm (15) grips one of the moveable parts (24) of the work piece and moves the work piece into an open position. The support member (25) serves for the lifting of the moveable part (24) of the work piece and is attached to the support arm (15) in such a manner that the forces acting on the support member (25) do not load any of the axes of rotation of the swivel head (17).

2 Claims, 1 Drawing Figure

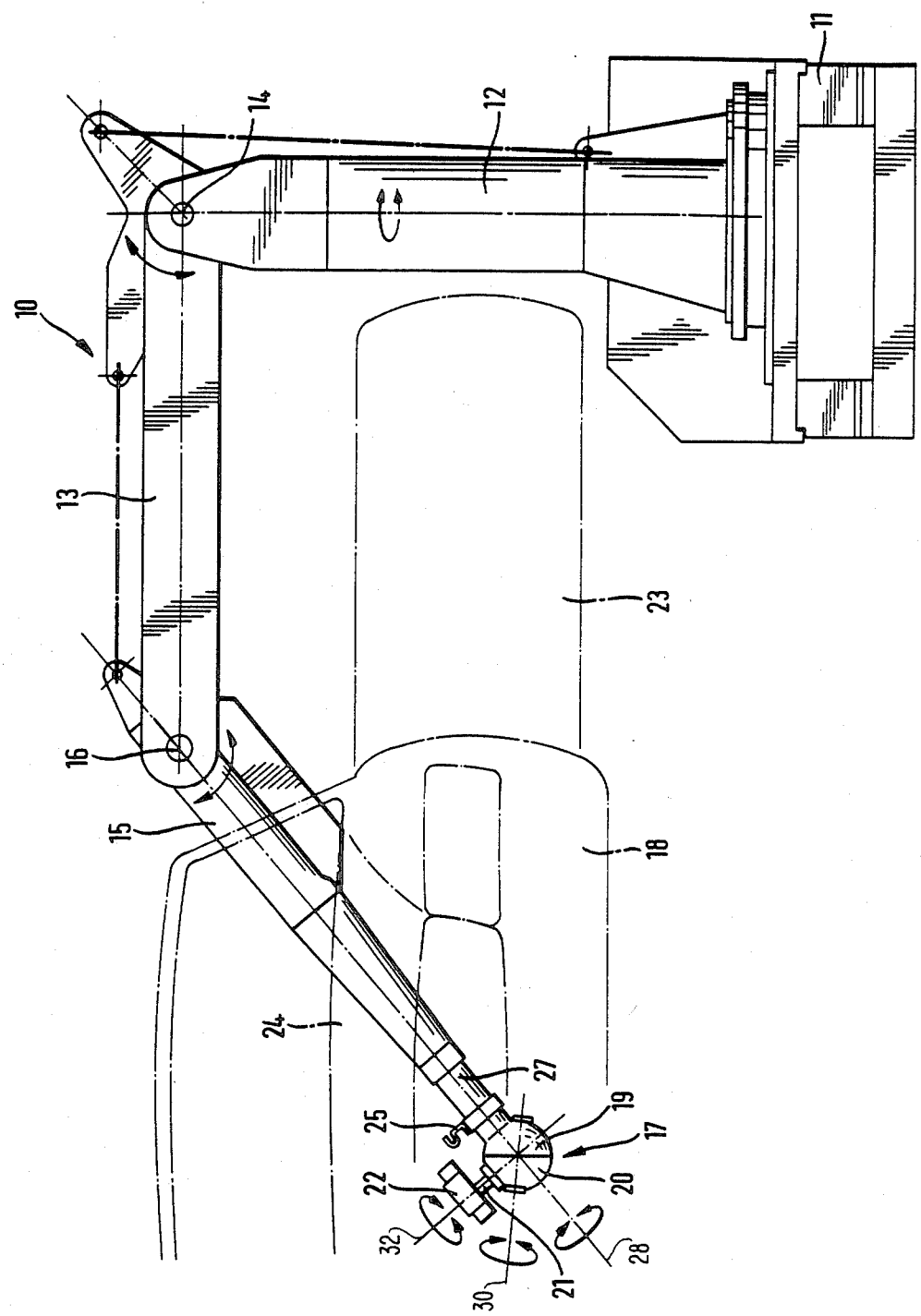

PROGRAM-CONTROLLED INDUSTRY ROBOT IN PARTICULAR LAQUERING (OR PAINTING) ROBOT

TECHNICAL FIELD

The invention relates to a program-controlled industry robot for the treatment of work pieces such as for color coating automotive bodies.

BACKGROUND ART

In handling devices which are generally termed industry robots and automatically controlled according to a motion program, it may be necessary to provide a tool supported on a three dimensionally pivotable swivel head. As the case may be, an extensible supporting arm has rotatory parts which can be rotated by servo motors (or actuator motors) around three axes at mutual angles from 45 degrees through 360 degrees (or more). In order that the swivel head parts can be rotated rapidly, they are supported with small mass and with as low a friction as possible. Their axes are relatively weak and only designed for very small bending forces. This can especially be the case if no contact occurs between tool and the work piece to be machined (or processed). Thus, no unforseeable forces appear, as for instance, in irradiation or sand blasting installations, lacquering installations and the like.

The hinge axes at the partitioning points of the support arm, which are usually vertically bendable and at its root horizontally pivotable, can be loaded with considerably greater forces due to the greater masses and the lever length of the arm sections.

In the automotive industry where such handling devices are utilized as lacquering robots, the swivel head carries a tool such as a lacquer spraying device. Further, the doors as well as motor hoods and trunk lids have to be opened prior to the lacquering or painting of the blank automobile body in order to obtain a satisfactory covering of the edge.

In already extensively automated lacquering or painting stations, relatively simple handling devices are specially provided and used to grip the doors and hoods to be opened and bring them into the desired position, in which they are maintained by further means during the subsequent lacquering (or painting) process. The considerable mechanical expense for this auxiliary activity is undesirable.

Already known from the DE-OS 32 44 053 (German document open for inspection) is a robot serving for the automatic color coating of automobile bodies of a type in which the gripping member is a door gripper for the opening and closing of the vehicle doors before and after the lacquering or painting process. The horizontal swinging of the doors does not require great forces. Since, however, the door gripper of the known robot is affixed to an actuating part provided also for the rotating of the lacquer spraying device, it could not be used for the lifting of the relatively heavy vehicle hoods because the rotating axis of the activating part could be damaged by the weight of the hood. Therefore, just as before, the above mentioned auxiliary robots are necessary.

The invention is based on the problems described. An industry robot, which besides its function proper of lacquering or other kind of treatment of work pieces, is in a position to lift automatically and without considerable additional mechanical expense, relatively heavy work pieces parts such as in particular the hoods of automobile bodies.

This problem is solved by the subject invention industry robot.

The invention will be explained in the following in more detail by an example of the embodiment with the aid of the drawing used in a lacquering or painting process, but can also be applied to other automated work processes such as the blowing out or exhausting of the inner space of work pieces, irradiation processes or also welding processes.

FIGURES IN THE DRAWINGS

FIG. 1 is a profile view of the subject invention.

DESCRIPTION OF THE PREFERRED EMBODIMENT

The complete industry robot in FIG. 1 is designated by 10. It consists of a base 11, a stand 12 which can be rotated on the base around its axis by a certain angle, a transverse 13 hinged at the upper end of the stand 12 which can swing around a horizontal axis 14 by an adjustable element (not shown) between the stand and transverse. A support arm 15 hinged to the front end of the transverse 13 which can be swiveled around a horizontal axis 16 by an adjustable element by a certain angle, and a swivel head, generally indicated at 17, at the free end of the support arm 15. The base 11 can be displaced with respect to its support area parallel to the dash-dotted line by means of a transport device (not shown) in a direction of the automobile body being moved perpendicularly to the plane of the drawing in order to be able to follow the body movement along a certain distance during the work process.

The swivel head 17 exhibits, as known in itself, three parts of which the first one, a part 19, rotatable by 360 degrees about a first axis 28, with the front end of the arm 15, carries a second part 20 which in relation to the first part 19 is again rotatable by 360 degrees about a second axis 30. The second part 20, as in the third part 21, a tool holder shaft is rotatable by 360 degrees about a third axis 32, on which the tool—in the present case a lacquer spraying device—is mounted. The shafts connecting the parts 19, 20 and 21 with each other are lying in each case at an angle of 45 degrees to each other. The parts are driven by servomotors. This permits the lacquer or paint spraying device 22 to assume any desired direction.

It is understood that a programmable control device is assigned to the illustrated part of the industry robot 10 which is designed in a known manner.

In order to bring the then closed doors 23 and hoods 24 on the automobile body 18 entering the lacquering (painting) station into a position required for the lacquering or painting, a hook 25 is attached on the front end of the support arm 15 ahead of the point of intersection of the first part 19 of the swivel head 17. The hook 25 is used for the gripping at suitable pieces of the doors 23 and hoods 24 in a convenient position and direction and in such a way that it does not lie in the path of action of the tool—in the described lacquering or painting device within the spray jet. This arrangement of the hook 25 utilizes on the one hand the controllable mobility of the stand 12, transverse 13 and the support arm 15 and as the case may be the base 11 of the industry robot 10. On the other hand, the forces occurring during the opening processes act only on the relatively stable universal joint shafts on the axes 14 and 16, but not on the shaft between the support arm 15 and the swivel arm 17, which can only be loaded with small bending forces, and between the individual parts of the swivel head.

The front end part 27 of the support arm 15, rotatable around the longitudinal axis of the swivel head 17, on the front end of the arm 15 on which the hook is attached rigidly as illustrated, is preferably supported telescopically slideably in support arm 15. The end part 27 can furthermore be rotatable around its longitudinal axis independently of the swivel head 17. Also, the hook 25 can be rotated around this axis.

I claim:

1. A program-controlled industry robot for the treatment of work pieces having movable parts (24) to be moved prior to the treatment, said robot comprising; a support arm (15) having a female end portion, means (12,13) supporting said arm whereby said arm is swivelable three dimensionally, a support arm end part (27) having a longitudinal axis (28) and being telescopically mounted in said female end portion and rotatably mounted about said longitudinal axis (28) and having a free end (19), a swivel head (17) mounted on the free end (19) of said support arm end part (27), said swivel head (17) having a first part (20) rotatable about a second axis (30) and a third part rotatable about a third axis (32), said second (30) and third (32) axis being nonparallel and intersetting with said first axis (28), a support member (25) movable with said support arm (15), and characterized by said support member (25) being affixed rigidly and directly on said support arm end part (27) and rotatable therewith for lifting of the movable part (24) of the work piece so that the forces acting on said support member (25) act directly on said support arm (15) and do not place any loads on said second (30) or third (32) axes of said swivel head (17).

2. An industry robot as set forth in claim 1 further characterized by said support member (25) being formed as a hook for the opening of the movable parts (24) of the work piece.

* * * * *